(12) United States Patent
Minto et al.

(10) Patent No.: US 8,770,912 B2
(45) Date of Patent: Jul. 8, 2014

(54) SYSTEMS, METHODS, AND APPARATUS FOR CONTROLLING TURBINE GUIDE VANE POSITIONS

(75) Inventors: Karl Dean Minto, Schenectady, NY (US); Dwight Eric Davidson, Greenville, SC (US); William E. Dixon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1082 days.

(21) Appl. No.: 12/768,829

(22) Filed: Apr. 28, 2010

(65) Prior Publication Data

US 2011/0268554 A1 Nov. 3, 2011

(51) Int. Cl.
*F01D 17/16* (2006.01)
(52) U.S. Cl.
USPC ................................. 415/1; 415/35
(58) Field of Classification Search
USPC ................... 415/13; 416/27, 30, 35
See application file for complete search history.

(56) References Cited

U.S. PATENT DOCUMENTS

| | | | |
|---|---|---|---|
| 4,978,280 A | 12/1990 | Tubbs | |
| 5,024,580 A | 6/1991 | Olive | |
| 5,586,857 A | 12/1996 | Ishii et al. | |
| 6,758,044 B2 | 7/2004 | Mannarino | |
| 7,232,287 B2 * | 6/2007 | Regunath | 415/160 |
| 7,422,414 B2 | 9/2008 | Fujii et al. | |
| 2007/0271929 A1 | 11/2007 | Berry | |
| 2007/0287992 A1 * | 12/2007 | Diolaiti et al. | 606/1 |
| 2008/0273965 A1 * | 11/2008 | Rajamani et al. | 415/129 |

\* cited by examiner

*Primary Examiner* — Nathaniel Wiehe
*Assistant Examiner* — Kayla McCaffrey
(74) *Attorney, Agent, or Firm* — Sutherland Asbill & Brennan LLP

(57) ABSTRACT

Certain embodiments of the invention may include systems, methods, and apparatus for controlling turbine guide vane positions. According to an example embodiment of the invention, a method is provided for controlling at least one turbine guide vane. The method includes receiving a reference signal associated with the at least one turbine guide vane, measuring an actuator position and an angular position associated with the at least one turbine guide vane, generating a deadband signal based at least in part on the angular position, and manipulating the at least one turbine guide vane based at least in part on the deadband signal and the reference signal.

20 Claims, 8 Drawing Sheets

SYSTEMS, METHODS, AND APPARATUS FOR CONTROLLING TURBINE GUIDE VANE POSITIONS

FIELD OF THE INVENTION

This invention generally relates to turbines, and in particular, to systems, methods, and apparatus for controlling turbine guide vane positions.

BACKGROUND OF THE INVENTION

Turbine compressors often utilize adjustable guide vanes in the inlet of the turbine to control air flow and pressure over a range of operation. The guide vanes are typically arranged in a row in the stationary (non-rotating) part of the compressor casing, and in some cases, 40 to 60 or more vanes are used on each turbine. The vane blade stem ends typically extend through a compressor casing, and may be attached to a linkage that simultaneously turns each individual vane blade. For example, a "uni-center ring" may be utilized to turn each individual blade as the ring is rotated circumferentially around the compressor inlet casing. Depending on whether one or more rows of these vanes are to be controlled, linkage elements may be ganged together to control the rows of vanes in unison.

To move the linkage, and in turn, adjust the guide vanes, a servo system including a hydraulic actuator is typically employed. For example, the position of the hydraulic actuator may be monitored and fed back to a controller in the servo system using transducers such as resolvers, linear variable differential transformers (LVDTs) or linear variable differential reluctance (LVDR) devices. One of the complications with such a system is that there may be a complex and non-linear relationship between the transducer measurement and the actual angle of the vane blades due not only to geometric and rotational transformations, but also to manufacturing tolerances and wear in the linkage. A lack of precision in the positioning of the guide vanes and/or variable stator vanes can result in a corresponding lack of precision in the control of flow through the machine, possibly resulting in a loss of output or efficiency or both.

BRIEF SUMMARY OF THE INVENTION

Some or all of the above needs may be addressed by certain embodiments of the invention. Certain embodiments of the invention may include systems, methods, and apparatus for controlling turbine guide vane positions, for instance, compressor inlet and variable stator vanes.

According to an example embodiment of the invention, a method is provided for controlling at least one turbine guide vane. The method includes receiving a reference signal associated with the at least one turbine guide vane, measuring an actuator position and an angular position associated with the at least one turbine guide vane, generating a deadband signal based at least in part on the angular position, and manipulating the at least one turbine guide vane based at least in part on the deadband signal and the reference signal.

According to another example embodiment, a system is provided for controlling air flow in a turbine. The system includes a gas turbine, at least one guide vane operable to control turbine axial air flow, and a controller. The controller is configured to receive a reference signal associated with the at least one guide vane, measure an actuator position and an angular position associated with the at least one guide vane, generate a deadband signal based at least in part on the angular position, and manipulate the at least one guide vane based at least in part on the deadband signal and the reference signal According to another example embodiment, an apparatus is provided for controlling air flow in a turbine. The apparatus includes at least one guide vane operable to control turbine axial air flow and a controller. The controller is configured to receive a reference signal associated with the at least one guide vane, measure an actuator position and an angular position associated with the at least one guide vane, generate a deadband signal based at least in part on the angular position, and manipulate the at least one guide vane based at least in part on the deadband signal and the reference signal.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable angular position control of compressor inlet and variable stator vanes, thus improving air flow control in a turbine. According to certain example embodiments, the use of rotary angle measurement devices such as resolvers or encoders and their use in a feedback control system may be used to provide direct sensing and control of the angular position for inlet guide vanes and variable stator vanes for axial compressors. In accordance with example embodiments, the invention may include a control algorithm combining the mechanisms of direct angular vane position measurement with the traditional linear actuator position measurement to mitigate any problems in direct feedback control of systems with hysteresis.

Example embodiments of the invention enable direct rotary angle measurements of the inlet or variable stator vanes for use in a compression system. According to an example embodiment, the measurements may be used in a feedback control system for positioning gas turbine or compression system guide vanes with improved accuracy and repeatability.

Various components, linkages, sensors, and servo system configurations for controlling the position of the guide vanes, according to example embodiments of the invention, will now be described with reference to the accompanying figures.

Figure 1:
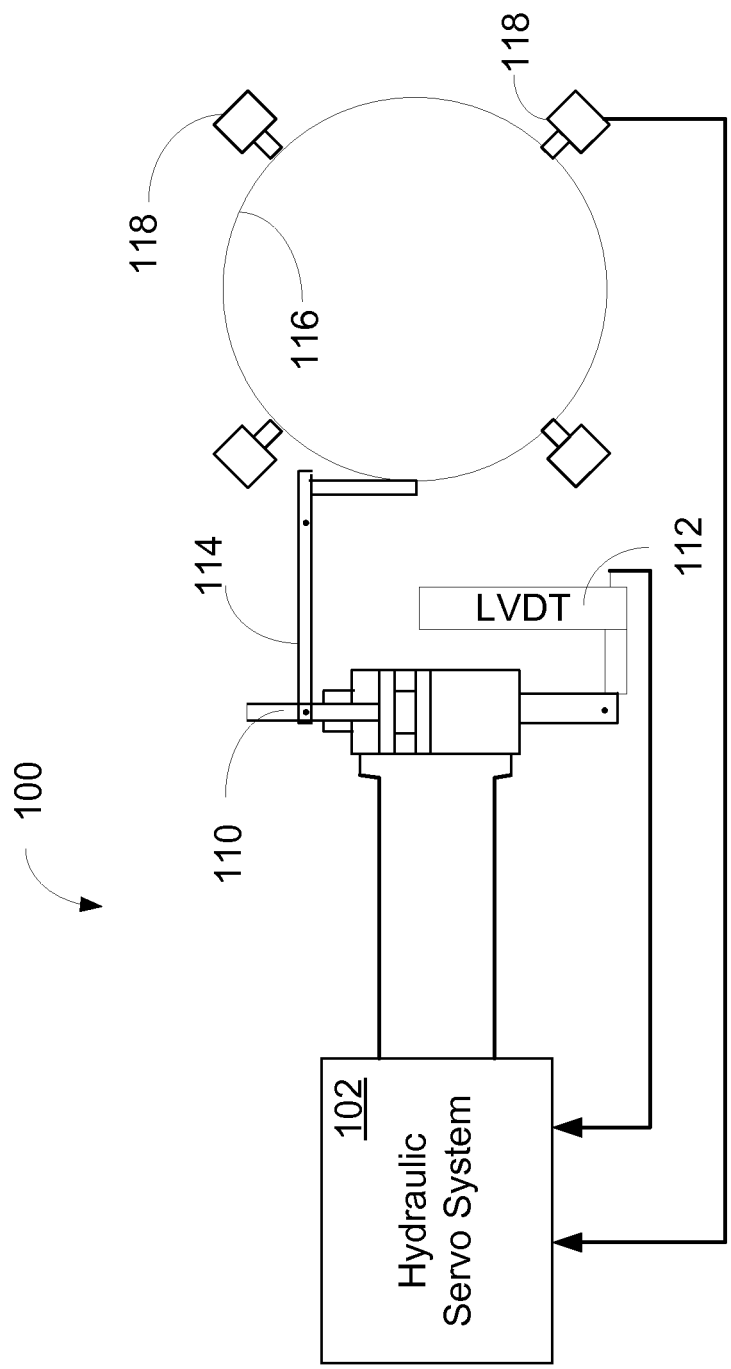
FIG. 1 is a block diagram of equipment used in a direct vane angle control system, according to an example embodiment of the invention.

FIG. 1 illustrates an example block diagram of equipment used in a direct vane angle control system, according to an example embodiment of the invention. According to example embodiments of the invention, the components shown in FIG. 1 may be utilized to control the inlet guide vanes (IGV's) and variable stator vanes (VSV's) of an axial flow compressor on a gas turbine. According to an example embodiment of the invention, a hydraulic servo 102 may be used to manipulate a guide vane actuator 110. The guide vane actuator may be connected to any number of components (such as turnbuckles, torque tubes, unison ring, lever arms, etc.) collectively referred to as the guide vane linkage system 114. According to an example embodiment of the invention, components of the guide vane linkage system 114 may be utilized to translate the linear motion of the actuator 110 into the rotary motion of a guide vane actuation ring 116. Individual vanes may be connected via lever arms to vane actuation ring 116, and the vanes may rotate according to the motion of the vane actuation ring 116. In accordance with example embodiments of the invention, and as indicated in FIG. 1, a linear translation sensing device 112, such as a linear variable differential transducer (LVDT), may be utilized to monitor the linear position of the guide vane actuator 110 ram or piston. In accordance with example embodiments of the invention, a rotary angle sensing devices 118 (such as resolver, rotational variable differential transducer (RVDT), or encoder, for example) may also be used to directly measure the rotation of an individual guide vane.

Figure 2:
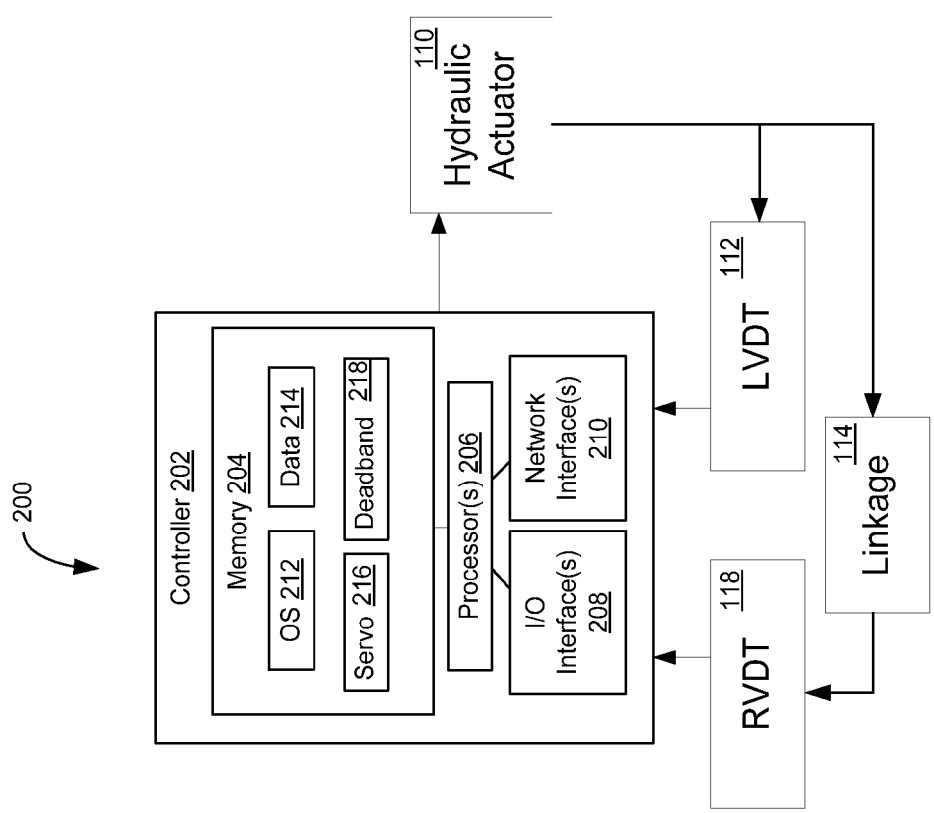
FIG. 2 is a block diagram of an illustrative direct vane control system, according to an example embodiment of the invention.

FIG. 2 depicts a block diagram of an illustrative direct vane control system 200 according to an example embodiment of the invention. The control system 200 may include a controller 202. According to an example embodiment, the controller 202 may include a memory 204, one or more processors 206, and one or more input/out (I/O) interfaces 208. Certain embodiments of the invention may include one or more network interfaces 210. The memory 204 may include an operating system (OS) 212 and data 214. According to example embodiments of the invention, the memory 204 may be configured or programmed with one or more special purpose modules for controlling the guide vane actuator, such as 110 in FIG. 1, based on input received from the linear translation sensing device, such as 112, and the rotary angle sensing devices, such as 118. For example, the memory 204 may include a servo module 216 and a deadband module 218, which will be further described below.

Figure 3:
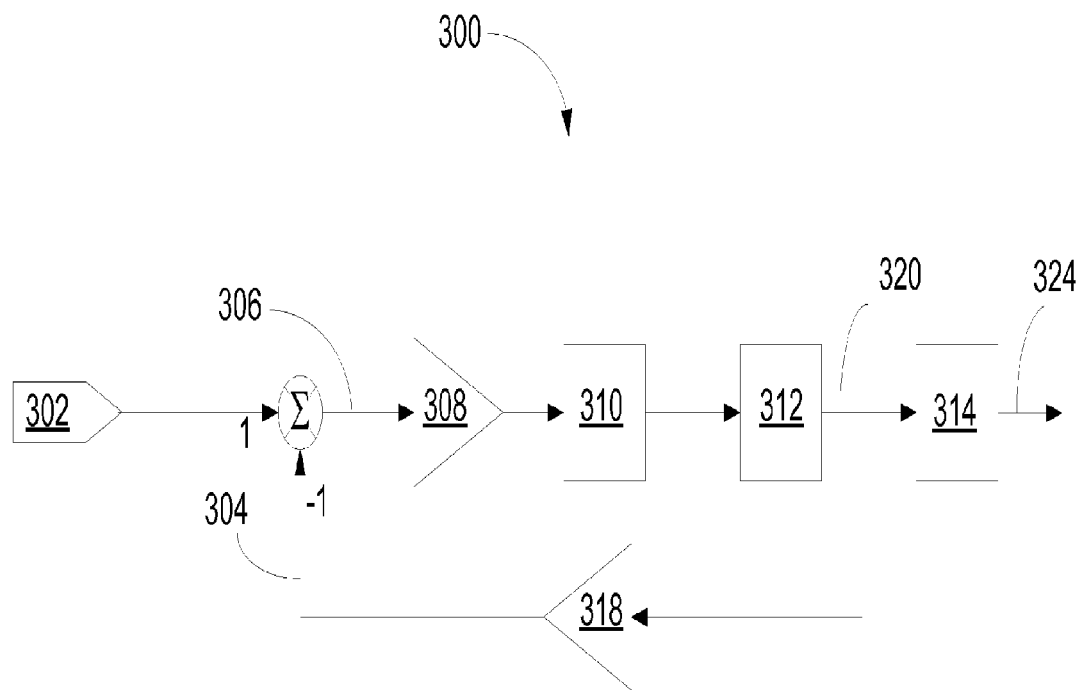
FIG. 3 is a block diagram of an illustrative control system, according to an example embodiment of the invention.

FIG. 3 depicts a typical control system block diagram. This diagram is included to illustrate an issue that may be overcome by using certain embodiments of the invention. The control system 300 of FIG. 3 may be utilized, for example, in a hydraulic servo system acting through a mechanical linkage for position control of inlet guide vanes or variable stator vanes on a gas turbine compressor. For example, a position command or position reference 302 may be summed with feedback 304 to produce an error 306. A control gain 308 may be applied to the error 306 to provide input to a servo 310, which may control an actuator 312. The actuator position 320 may be measured by a linear position sensor 318 (for example by an LVDT position sensor) and used for feedback 304. The guide vane position 324, in this case, may be adjusted based on the linear position sensor 318, which may be separated from the actual guide vanes by linkage 314. This control system 300 may be used to adjust the output of the linkage 314, to match the output of the position reference 302. Assuming that the linkage 314 is suitable and that linear position sensor 318 is suitably calibrated, then the output of the linear position sensor 318 may be sufficient to predict the guide vane position for feedback control purposes.

Figure 4:
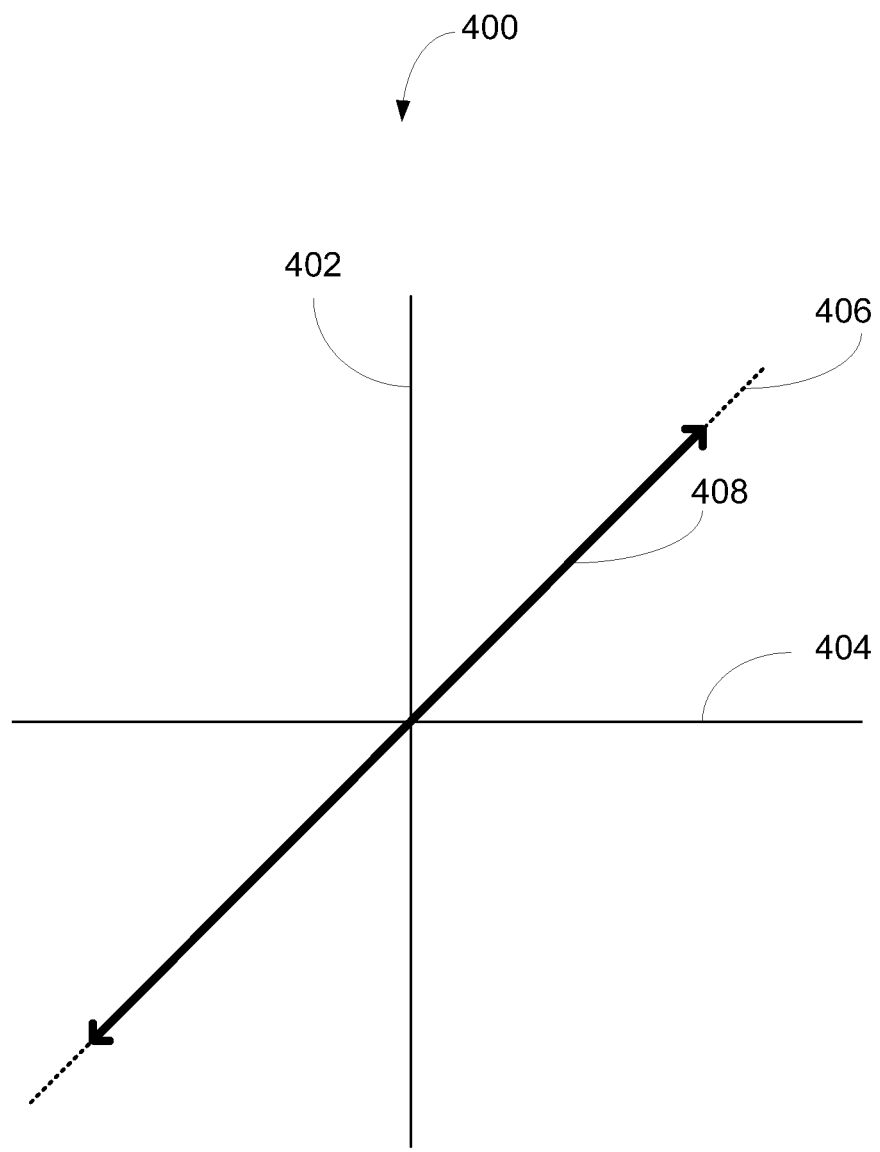
FIG. 4 is a graph of an illustrative ideal guide vane angle vs. command, according to an example embodiment of the invention.

FIG. 4 depicts the ideal situation described above, where the guide vane linkage system, such as 114 in FIG. 1, is suitable (for example, without hysteresis or play) and the linear translation sensing device, such as 112 in FIG. 1, is suitably calibrated. FIG. 4, for example, shows an ideal tracking line 406 that is plotted as a function of guide vane angle 402 vs. the guide vane command 404. The ideal tracking line 406 follows the ideal response 408 in this hypothetical perfect system, and in such a case, a simple control system, such as 300 in FIG. 3, may be adequate to control such a suitable system.

However, with any real mechanical linkage used to translate the linear motion of the hydraulic actuator ram to the rotary motion of the individual guide vanes, there may inevitably be a small but non-zero amount of slop or play present, arising due to the accumulation of manufacturing tolerances in the various fittings between the linkage components. This slop or play may result in two undesirable effects on the vane positioning system: (1) there may be a loss in absolute positioning accuracy, and (2) there may be a loss in repeatability, due to effects such as hysteresis. Example embodiments of this invention may alleviate both of these effects.

Figure 5:
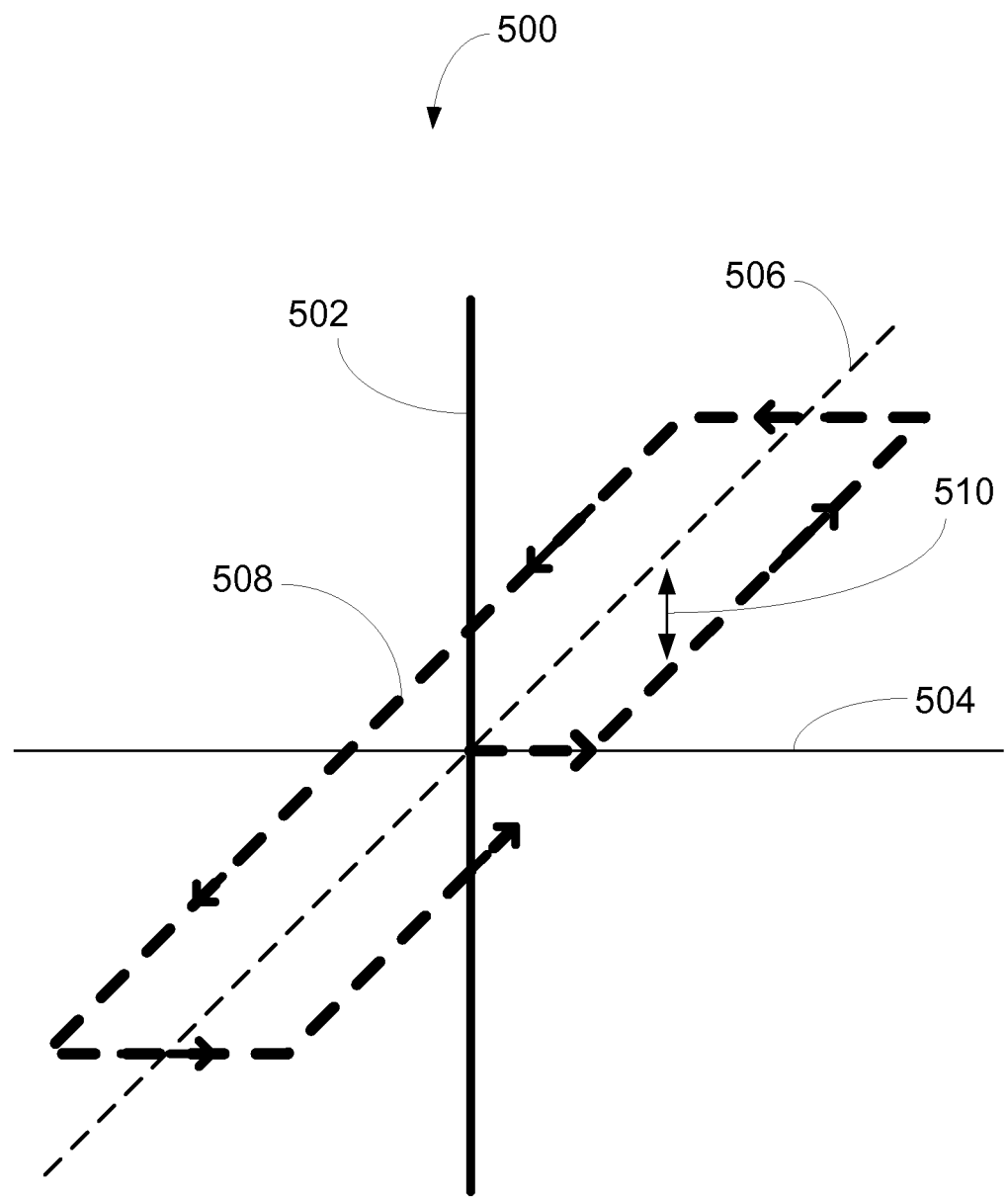
FIG. 5 is a graph of an illustrative guide vane angle vs. command with linkage hysteresis, according to an example embodiment of the invention.

FIG. 5 depicts a graph of an illustrative guide vane angle vs. command with linkage hysteresis 500 according to an example embodiment of the invention. In this figure, the guide vane angle 502 is plotted as a function of the guide vane command 504. As in FIG. 4, the ideal tracking line 506 is shown as a linear relationship between the two variables (502, 504). However, if the guide vane linkage system, such as 114 in FIG. 1, is imperfect, the actual guide vane angle 508 may not follow the ideal tracking line 506, but instead, may have positioning error 510.

In a departure from existing control methods, and according to example embodiments of the invention, error in positioning of the guide vanes due to play, non-linearities, etc., in the guide vane linkage system, such as 114 in FIG. 1, may be at least partially compensated or reduced by combining measurements taken at the guide vane actuator, such as 110 in FIG. 1, using the linear translation sensing device, such as 112 in FIG. 1, and measurements taken at the guide vanes using a rotary angle sensing device, such as 118 in FIG. 1.

Figure 6:
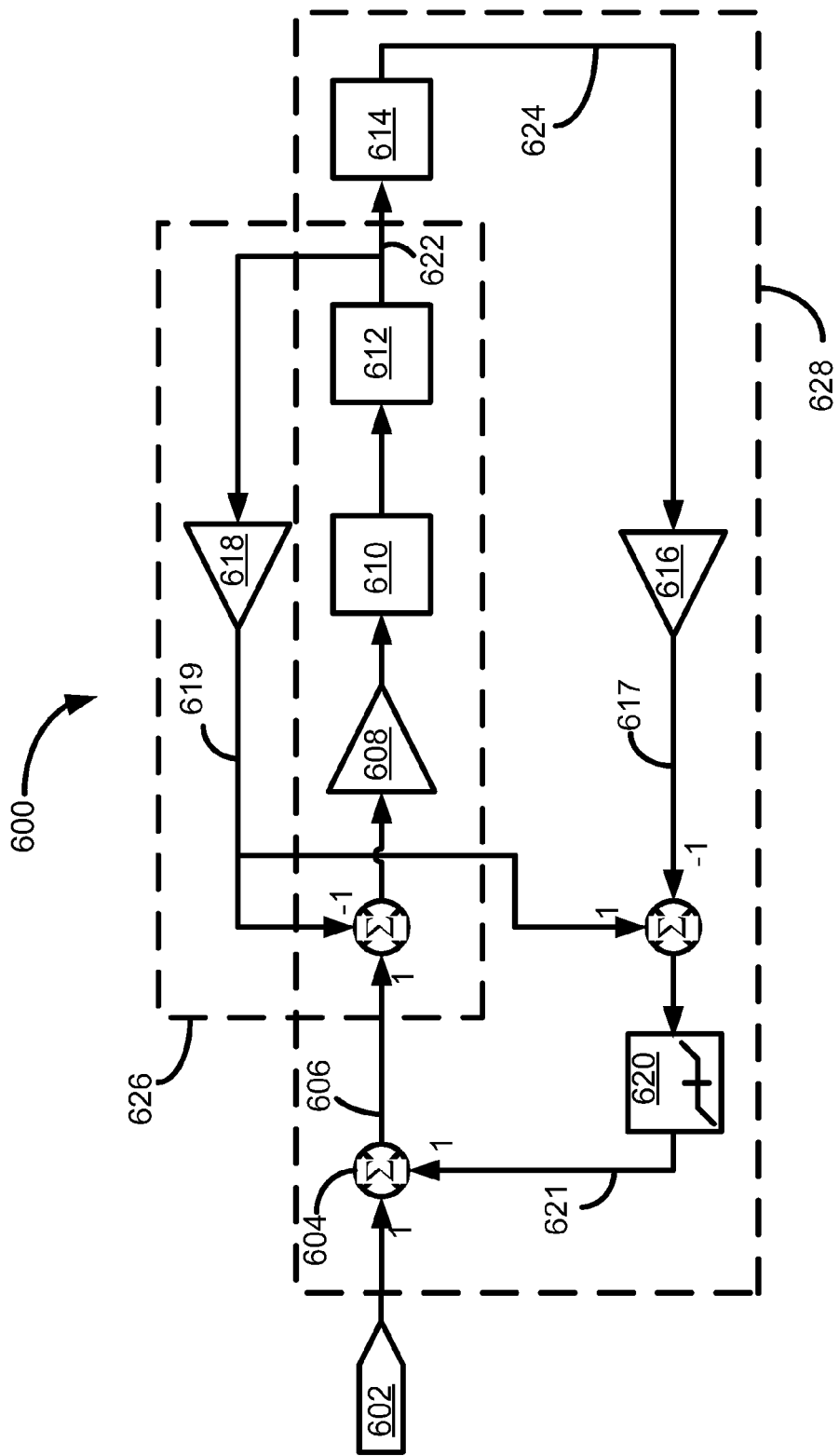
FIG. 6 is a block diagram of an illustrative combined deadband control system according to an example embodiment of the invention.

FIG. 6 illustrates a combined deadband control system block diagram 600, according to an example embodiment of the invention, which may utilize guide vane actuator position 622 and guide vane angular position 624 as feedback, and additionally utilize a deadband process 620 or module to improve positioning accuracy and repeatability in the guide vane control.

In accordance with an example embodiment of the invention, a nominal guide vane reference signal 602 may be used as an input to the control system 600. The nominal guide vane reference signal 602 may be summed with a deadband signal 621 in summing junction 604 to produce a guide vane reference signal 606. In an example embodiment, a measured guide vane actuator position feedback signal 619 may be subtracted from the guide vane reference signal 606, and the resulting error signal may be utilized in an inner feedback loop 626. According to an example embodiment, the inner feedback loop 626 may include control gain 608, a servo 610 a hydraulic actuator (with position limits) 612 and a guide vane actuator position sensor 618. In accordance with an example embodiment of the invention, the guide vane actuator position sensor 618 may provide the guide vane actuator position feedback signal 619 for use within both the inner feedback loop 626, and an outer feedback loop 628, which will be described below.

In accordance with an example embodiment of the invention, the outer feedback loop 628 may receive the guide vane actuator position 622, which may be utilized to control the linkage system (with hysteresis) 614, resulting in a guide vane angular position 624 that may be measured by a guide vane angular position sensor 616. In an example embodiment, the resulting measured guide vane angular position feedback signal 617 may be subtracted from the measured guide vane actuator position feedback signal 619 (generated via the inner feedback loop 626), and the resulting error may be fed into a deadband process 620 or module. According to an example embodiment, the deadband process 620 or module may produce a deadband signal 621 that may be added to the nominal guide vane reference signal 602.

According to an example embodiment, the deadband process 620 may produce a deadband signal 621 that is about zero unless an associated input signal to the deadband process 620 exceeds a predetermined magnitude. In accordance with an example embodiment, the deadband signal 621 may linearly relate to the deadband process 620 input signal when the input signal exceeds the predetermined magnitude. For example, the deadband signal 621 may comprises an output signal of about zero unless the associated input signal exceeds about 0.05 percent of full scale. If the input signal exceeds about 0.05 percent of full scale, then the deadband output signal 621 may linearly relate to the deadband process 620 input signal. In accordance with example embodiments of the invention, the predetermined limit may be set or adjusted as necessary, and may range, for example, from about 0.01 percent of full scale to about 10 percent of full scale, depending on the condition of the linkage system and other factors. According to example embodiments, the deadband signal 621 may be based on a difference between the guide vane actuator (linear) position 622 and the guide vane angular position 624.

Figure 7:
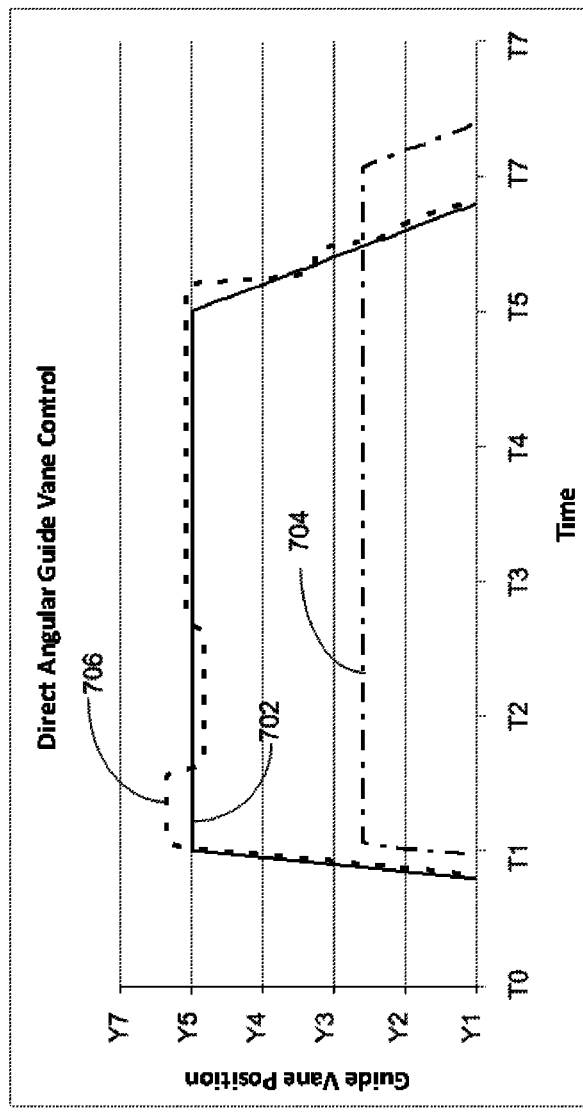
FIG. 7 is a graph of an illustrative guide vane reference position according to an example embodiment of the invention.

FIG. 7 is a graph of illustrative guide vane reference positions as a function of time, and according to an example embodiment of the invention. The solid curve in this graph represents an example nominal guide vane reference position 702, which may be used as input to the control system, such as guide vane leakage system 602 in FIG. 6. When the mechanical linkage, such as guide vane leakage system 114 in FIG. 1, includes play and/or hysteresis, and when the control system, such as 300 in FIG. 3, is utilized where only feedback from the linear actuator is used, such as feedback 304 in FIG. 3, then a guide vane position may not accurately follow the nominal guide vane reference position 702. Such a case is depicted in the curve labeled 704 in FIG. 7. However, for a relatively similar mechanical system (with hysteresis), when the combined deadband control system 600, such as in FIG. 6, is utilized, the actual guide vane position with linear and angular actuator feedback 706 may more accurately follow the nominal guide vane reference position 702.

Figure 8:
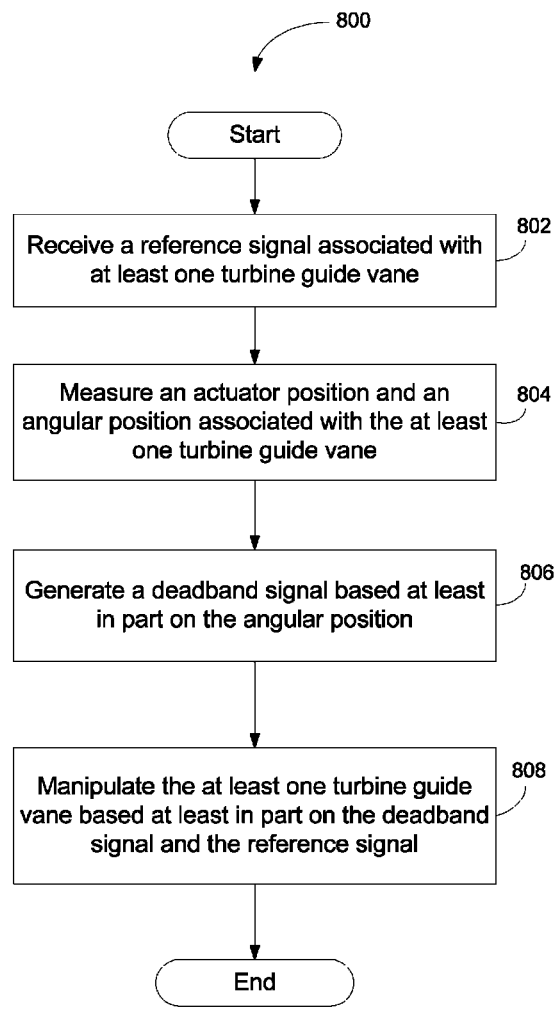
FIG. 8 is a flow diagram of an example method according to an example embodiment of the invention.

An example method 800 for controlling at least one turbine guide vane will now be described with reference to the flow diagram of FIG. 8. The method 800 starts in block 802, where, according to an example embodiment of the invention, the method includes receiving a reference signal associated with at least one turbine guide vane. In block 804, the method 800 includes measuring an actuator position and an angular position associated with the at least one turbine guide vane. In block 806, the method 800 includes generating a deadband signal based at least in part on the angular position. And in block 808, the method 800 includes manipulating the at least one turbine guide vane based at least in part on the deadband signal and the reference signal. The method 800 ends after block 808.

Accordingly, example embodiments of the invention can provide the technical effects of creating certain systems and methods that provide positioning gas turbine or compression system guide vanes with improved accuracy. Example embodiments of the invention can provide the further technical effects of providing systems and methods for positioning gas turbine or compression system guide vanes with improved repeatability.

In example embodiments of the invention, the direct vane control systems 100, 200 and the combined deadband control system 600 may include any number of software and/or hardware applications that are executed to facilitate any of the operations.

In example embodiments, one or more I/O interfaces may facilitate communication between the direct vane control systems 100, 200 and the combined deadband control system 600, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the direct vane control systems 100, 200 and the combined deadband control system 600. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the direct vane control systems 100, 200 and the combined deadband control system 600 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the direct vane control systems 100, 200 and the combined deadband control system 600 with more or less of the components illustrated in FIGS. 1, 2 and 6.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling at least one turbine guide vane comprising:

receiving a nominal reference guide signal;
receiving a deadband signal;
generating a reference signal associated with the at least one turbine guide vane, wherein the reference signal is a sum of the nominal reference guide signal and the deadband signal;
receiving a measured guide vane actuator position feedback signal;
generating an error signal based on a difference between the reference signal and the measured guide vane actuator position feedback signal, wherein the error signal is used at least to improve position accuracy of the at least one turbine guide vane;
measuring an actuator position and an angular position associated with the at least one turbine guide vane, wherein the actuator position is based at least in part on the error signal;
receiving a measured guide vane angular position feedback signal based at least in part on the angular position;
generating an input signal, wherein the input signal is a difference between the measured guide vane actuator position feedback signal and the measured guide vane angular position feedback signal;
generating an updated deadband signal based at least in part on the input signal; and
manipulating the at least one turbine guide vane based at least in part on the updated deadband signal and the reference signal.

2. The method of claim 1, wherein generating the updated deadband signal is further based on a difference between the actuator position and the angular position.

3. The method of claim 1, wherein generating the updated deadband signal comprises generating an output signal of about zero unless an associated input signal exceeds a predetermined magnitude that comprises a percentage, and wherein the output signal is linearly related to the input signal when the input signal exceeds the predetermined magnitude, and wherein the associated input signal is based at least in part on a difference between the actuator position and the angular position.

4. The method of claim 1, wherein generating the updated deadband signal comprises generating the output signal of about zero unless an associated input signal exceeds about 0.05 percent of full scale, wherein the output signal is continuous and linearly related to the input signal when the input signal exceeds about 0.05 percent of full scale, and wherein the associated input signal is based at least in part on a difference between the actuator position and the angular position.

5. The method of claim 1, wherein manipulating the at least one turbine guide vane is further based on the actuator position.

6. The method of claim 1, wherein manipulating the at least one turbine guide vane is further based on an inner feedback loop comprising feedback based at least in part on the actuator position.

7. The method of claim 1, wherein manipulating the at least one turbine guide vane is further based on an outer feedback loop comprising the angular position.

8. A system for controlling air flow in a turbine comprising:
a gas turbine;
at least one guide vane operable to control turbine axial air flow; and
a controller configured to:
receive a nominal reference guide signal;
receive a deadband signal;

generate a reference signal associated with the at least one guide vane, wherein the reference signal is a sum of the nominal reference signal and the deadband signal;

receive a measured guide vane actuator position feedback signal;

generate an error signal based on a difference between the reference signal and the actuator position feedback signal, wherein the error signal is used at least to improve position accuracy of the at least one guide vane;

measure an actuator position and an angular position associated with the at least one guide vane, wherein the actuator position is based at least in part on the error signal;

receive a measured guide vane angular position feedback signal based at least in part on the angular position;

generate an input signal, wherein the input signal is a difference between the measured guide vane actuator position feedback signal and the measured guide vane angular position feedback signal;

generate an updated deadband signal based at least in part on the input signal; and manipulate the at least one guide vane based at least in part on the updated deadband signal and the reference signal.

9. The system of claim 8, wherein the updated deadband signal is further based on a difference between the actuator position and the angular position.

10. The system of claim 8, wherein the updated deadband signal comprises an output signal of about zero unless an associated input signal exceeds a predetermined magnitude that comprises a percentage, and wherein the output signal is linearly related to the input signal when the input signal exceeds the predetermined magnitude, and wherein the associated input signal is based at least in part on a difference between the actuator position and the angular position.

11. The system of claim 8, wherein the updated deadband signal comprises an output signal of about zero unless an associated input signal exceeds about 0.05 percent of full scale, wherein the output signal is continuous and linearly related to the input signal when the input signal exceeds about 0.05 percent of full scale, and wherein the associated input signal is based at least in part on a difference between the actuator position and the angular position.

12. The system of claim 8, wherein the at least one guide vane is further manipulated based on the actuator position.

13. The system of claim 8, wherein the at least one guide vane is further manipulated based on an inner feedback loop comprising the actuator position.

14. The system of claim 8, wherein the at least one guide vane is further manipulated based on an outer feedback loop comprising the angular position.

15. An apparatus for controlling air flow in a gas turbine comprising:

at least one guide vane operable to control turbine axial air flow; and a controller configured to:

receive a nominal reference guide signal;

receive a deadband signal;

generate a reference signal associated with the at least one guide vane, wherein the reference signal is a sum of the nominal reference signal and the deadband signal;

receive a measured guide vane actuator position feedback signal;

generate an error signal based on a difference between the reference signal and the actuator position feedback signal, wherein the error signal is used at least to improve position accuracy of the at least one guide vane;

measure an actuator position and an angular position associated with the at least one guide vane, wherein the actuator position is based at least in part on the error signal;

receive a measured guide vane angular position feedback signal based at least in part on the angular position;

generate an input signal, wherein the input signal is a difference between the measured guide vane actuator position feedback signal and the measured guide vane angular position feedback signal;

generate an updated deadband signal based at least in part on the input signal; and manipulate the at least one guide vane based at least in part on the updated deadband signal and the reference signal.

16. The apparatus of claim 15, wherein the updated deadband signal is further based on a difference between the actuator position and the angular position.

17. The apparatus of claim 15, wherein the updated deadband signal comprises an output signal of about zero unless an associated input signal exceeds a predetermined magnitude that comprises a percentage, and wherein the output signal is linearly related to the input signal when the input signal exceeds the predetermined magnitude, and wherein the associated input signal is based at least in part on a difference between the actuator position and the angular position.

18. The apparatus of claim 15, wherein the updated deadband signal comprises an output signal of about zero unless an associated input signal exceeds about 0.05 percent of full scale, wherein the output signal is continuous and linearly related to the input signal when the input signal exceeds about 0.05 percent of full scale, and wherein the associated input signal is based at least in part on a difference between the actuator position and the angular position.

19. The apparatus of claim 15, wherein the at least one guide vane is further manipulated based on the actuator position.

20. The apparatus of claim 15, wherein the at least one guide vane is further manipulated based on an inner feedback loop comprising the actuator position, and on an outer feedback loop comprising the angular position.

* * * * *